(12) United States Patent
Koike

(10) Patent No.: US 8,462,261 B2
(45) Date of Patent: Jun. 11, 2013

(54) IMAGE PICKUP APPARATUS AND CONTROL METHOD AND PROGRAM OF THE SAME

(75) Inventor: Koutarou Koike, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 382 days.

(21) Appl. No.: 12/879,425

(22) Filed: Sep. 10, 2010

(65) Prior Publication Data

US 2011/0063462 A1    Mar. 17, 2011

(30) Foreign Application Priority Data

Sep. 14, 2009  (JP) ................................ 2009-212111

(51) Int. Cl.
*H04N 5/222* (2006.01)
*H04N 5/225* (2006.01)

(52) U.S. Cl.
USPC ............................ 348/370; 348/371; 348/372

(58) Field of Classification Search
USPC ................................................ 348/370–372
See application file for complete search history.

(56) References Cited

U.S. PATENT DOCUMENTS

| 2002/0009296 A1* | 1/2002 | Shaper et al. .................. 396/56 |
| 2006/0270438 A1 | 11/2006 | Choi |
| 2008/0298792 A1* | 12/2008 | Clark .............................. 396/56 |
| 2010/0008658 A1* | 1/2010 | King ............................... 396/56 |
| 2010/0316364 A1* | 12/2010 | Clark .............................. 396/57 |

FOREIGN PATENT DOCUMENTS

| JP | 2006-148471 A | 6/2006 |
| JP | 2006-314093 A | 11/2006 |

* cited by examiner

*Primary Examiner* — James Hannett
(74) *Attorney, Agent, or Firm* — Carter, DeLuca, Farrell & Schmidt LLP

(57) ABSTRACT

An image pickup apparatus for wireless-communicating with a camera accessory which periodically transits to a sleep state, transmits a change signal for changing the setting of a power saving state in an accessory apparatus, to the accessory apparatus in accordance with a first operation for instructing an image pickup preparation to decide an setting for image pickup or a second operation for instructing the image pickup based on the image pickup preparation operation being accepted by an operation unit of the image pickup apparatus, thereby efficiently suppressing stand-by electricity consumption and preventing a delay from occurring in timing when a predetermined process is executed between apparatuses.

17 Claims, 5 Drawing Sheets

IMAGE PICKUP APPARATUS AND CONTROL METHOD AND PROGRAM OF THE SAME

BACKGROUND OF THE INVENTION

1. Field of the Invention

The present invention relates to an image pickup apparatus which can wireless-communicate with another apparatus.

2. Description of the Related Art

In recent years, a wireless communicating apparatus is installed into a digital still camera (hereinbelow, referred to as a camera), so that the camera and a camera accessory wireless-communicate with each other, thereby enabling them to mutually control. At the time of the wireless communication, a communication module of the camera or camera accessory which is driven is made to periodically transit to a sleep state, thereby suppressing stand-by electricity consumption to a value smaller than that in a communication always-active state.

However, by using the sleep state, timing when the camera and the camera accessory can communicate is limited. Therefore, if a transmission side transmitted a command to a reception side in the sleep state, the reception side cannot receive the command until it is returned back to the communication active state from the sleep state. There is, consequently, a case where timing at which the reception side executes the command from the transmission side is delayed.

For example, when a light emitting command is transmitted from the camera to a flash device serving as a camera accessory, even if the light emitting command was transmitted from the camera for a period of time during which the flash device is in the sleep state, the flash device cannot receive the light emitting command until the flash device is returned back to the communication active state from the sleep state. Therefore, there is a case where timing at which the flash device emits light is delayed, so that there may be a possibility that a synchronization between the camera and the flash device becomes impossible. The "synchronization" is used here to denote a state where the light of a necessary amount can be exposed to an image pickup element of the camera for a period of time during which a shutter of the camera has fully been released. However, if the flash device is set into the communication always-active state in order to perform the synchronization, the stand-by electricity consumption becomes larger than that in the case of using the sleep state.

Therefore, it is necessary to consider a wireless communication system in which while suppressing the stand-by electricity consumption as much as possible, a delay of an execution timing of a predetermined processing is not caused between the camera and the camera accessory.

In the Official Gazette of Japanese Patent Application Laid-Open No. 2006-314093, there has been proposed a control method whereby, in an information processing apparatus, a period of a sleep state is controlled according to permission/inhibition of reception of data of the reception side or an electric power supply amount of a power source unit, thereby minimizing electricity consumption. In the Official Gazette of Japanese Patent Application Laid-Open No. 2006-148471, there has been proposed a control method whereby in order to shorten, as much as possible, a time required for information processing apparatuses to perform a pairing, a period of a sleep state is shortened when a mode is switched to a pairing mode.

However, the method proposed in the Official Gazette of Japanese Patent Application Laid-Open No. 2006-314093 is the control method for minimizing the electricity consumption of the information processing apparatus and does not eliminate a delay of timing at which a predetermined processing is executed between the information processing apparatuses.

According to the method proposed in the Official Gazette of Japanese Patent Application Laid-Open No. 2006-148471, in order to allow the information processing apparatus to find, as fast as possible, the partner to which the pairing is performed, the period of the sleep state is shortened in the pairing mode. In other words, the content disclosed in this patent document is that when the mode is switched to the pairing mode, the period of the sleep state is shortened momentarily, and it does not intend to eliminate a delay of timing at which a predetermined processing is executed between the information processing apparatuses after that.

SUMMARY OF THE INVENTION

In order to solve the above-described problems, it is an aspect of the invention to provide an image pickup apparatus for wireless-communicating with another apparatus, in which while efficiently suppressing stand-by electricity consumption, a delay of timing at which a predetermined processing is executed between apparatuses can be avoided.

According to the present invention, an image pickup apparatus comprises: a wireless communication unit, configured to wirelessly communicate with an external apparatus which is arranged to be periodically set into a power saving state; and an operation unit, configured to accept a first operation for instructing an image pickup preparation to decide an setting for image pickup and a second operation for instructing an image pickup which is based on the image pickup preparation operation, wherein the wireless communication unit transmits, to the external apparatus, a change signal for changing the setting of the power saving state of the external apparatus, in accordance with the first or second operation being accepted by the operation unit.

According to another scope of the present invention, an accessory apparatus of an image pickup apparatus having an operation unit, configured to accept a first operation for instructing an image pickup preparation to decide an setting for image pickup and a second operation for instructing an image pickup which is based on the image pickup preparation operation, comprises: a wireless communication unit, configured to wireless-communicate with the image pickup apparatus; a state setting unit, configured to periodically set the accessory apparatus into a power saving state; and a state control unit, configured to control the state setting unit to change the setting of the power saving state when a change signal transmitted from the image pickup apparatus is received by the wireless communication unit, wherein the change signal is a signal for changing the setting of the power saving state and is transmitted in accordance with that the first operation for instructing the image pickup preparation to decide the setting for image pickup or the second operation for instructing the image pickup which is based on the image pickup preparation operation has been accepted by the operation unit of the image pickup apparatus.

According to the image pickup apparatus and the accessory apparatus of the present invention, while suppressing standby electricity consumption as much as possible, another apparatus can execute a predetermined processing at an exact timing thereof.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanied drawings.

First Embodiment

Figure 1:
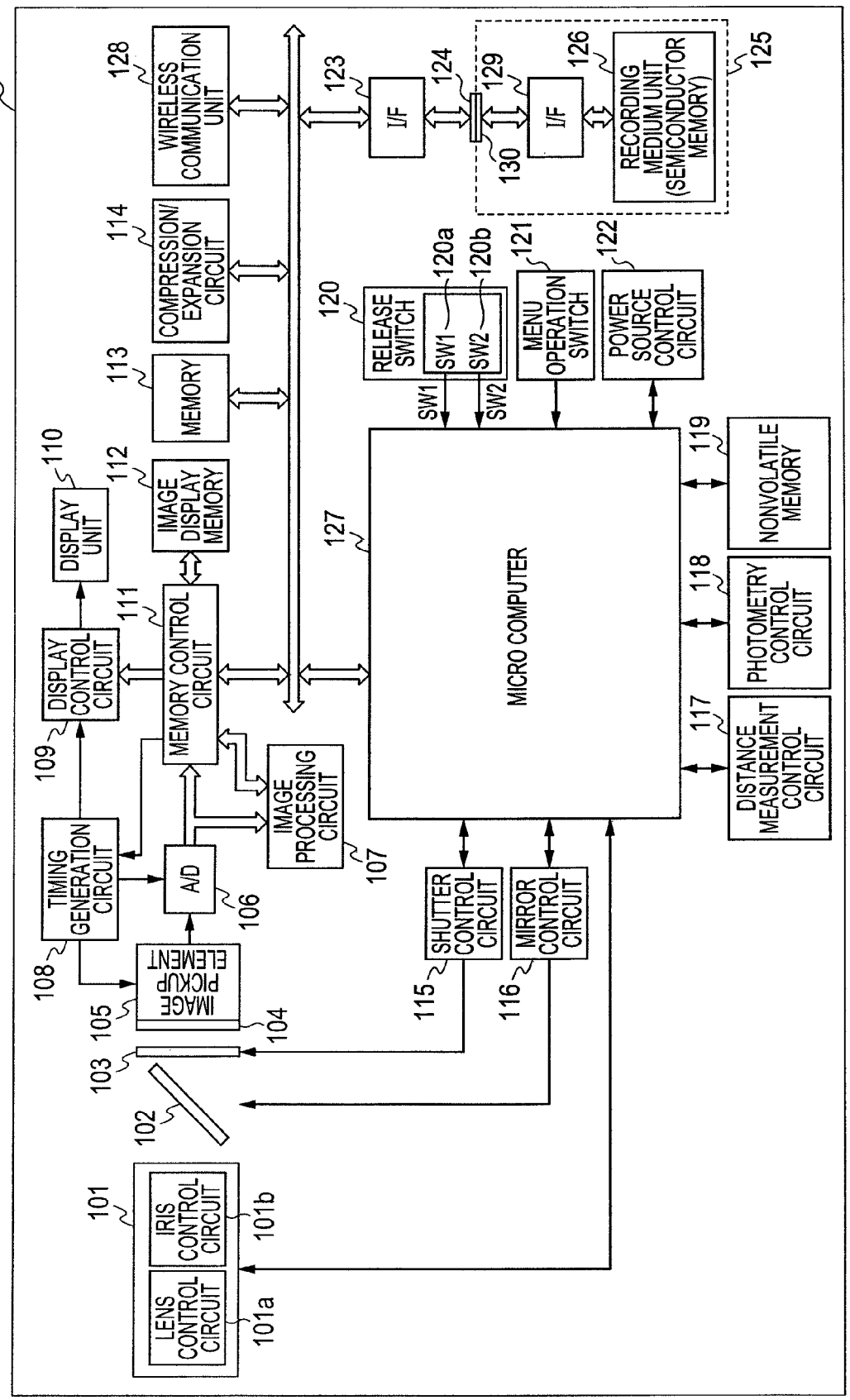
FIG. 1 is a schematic diagram illustrating an example of a construction of a camera serving as an image pickup apparatus according to an embodiment of the invention.

FIG. 1 is a schematic diagram illustrating an example of a construction of a digital still camera (hereinbelow, referred to as a camera) serving as an image pickup apparatus according to the first embodiment of the invention. In FIG. 1, a camera 100 in the embodiment is illustrated.

In the camera 100, an interchangeable photographing lens unit 101 is constructed by a plurality of lens groups. The photographing lens unit 101 communicates with a microcomputer 127 and performs an auto-focus (AF) by a lens control circuit 101a in the photographing lens unit 101. In more detail, a focal point is in-focused by moving a focusing lens in the photographing lens unit 101 by control of the lens control circuit 101a. A movement amount is arithmetically operated by the microcomputer 127 based on an output of a distance measurement control circuit 117. An iris control circuit 101b is provided in the photographing lens unit 101. The iris control circuit 101b changes an optical iris value.

A quick return mirror 102 is arranged in a photographing optical path and can be moved between a position where object light from the photographing lens is guided to a finder optical system (not shown) and a position where it is withdrawn from the photographing optical path. A shutter 103 is provided. An optical filter 104 is covered with dustproof glass. An image pickup element 105 converts an optical image into an electric signal. An A/D converter 106 converts an analog signal output of the image pickup element 105 into a digital signal.

A timing generation circuit 108 supplies a clock signal and a control signal to the A/D converter 106. The timing generation circuit 108 is controlled by a memory control circuit 111 and the microcomputer 127, which will be described hereinafter.

An image processing circuit 107 executes predetermined pixel interpolation processing, development processing, and the like on data from the A/D converter 106 or data from the memory control circuit 111 based on processing data added to the data. The memory control circuit 111 controls the A/D converter 106, the image processing circuit 107, the timing generation circuit 108, an image display memory 112, a memory 113, and a compression/expansion circuit 114.

Data of the A/D converter 106 is written into the image display memory 112 or memory 113 through the image processing circuit 107 and the memory control circuit 111. A display control circuit 109 and the image display memory 112 are provided. A display unit 110 is constructed by a TFT•LCD (Thin Film Transistor Liquid Crystal Display) or the like. The image data for display, written in the image display memory 112, is displayed to the display unit 110 by the display control circuit 109.

The memory 113 is used as an image buffer area for temporarily storing photographed non-compressed image data. The memory 113 includes a work buffer area for holding processing data which is used when the image data is development-processed by the image processing circuit 107 and arithmetic operation results of AF, AE (auto-exposure), and AWB (auto white balance) and storing other data which is temporarily used. The memory 113 also includes a file buffer area for storing compressed image data compressed by the compression/expansion circuit 114. The memory 113 also has a memory capacity enough to store a predetermined number of still images or a moving image of a predetermined time. Even in the case of a continuous photographing for continuously photographing a plurality of still images, a large amount of images can be written into the memory 113 at a high speed.

The compression/expansion circuit 114 compresses or expands the image data as JPEG data by an adaptive discrete cosine transform (ADCT) or the like. The compression/expansion circuit 114 reads the image data stored in the memory 113, compression-processes or expansion-processes it, and writes the processed data into the memory 113.

A shutter control circuit 115 controls the shutter 103. A mirror control circuit 116 makes a control drive of the quick return mirror to withdraw it from the photographing optical path. The distance measurement control circuit 117 controls a focusing lens of the photographing lens unit 101 on the basis of its output. A photometry control circuit 118 measures brightness of an object and controls an exposure on the basis of its output.

The microcomputer 127 controls the whole camera 100. A nonvolatile memory 119 is provided. Various kinds of programs such as program adapted to execute an image pickup processing, program adapted to execute an image processing, program adapted to record formed image file data onto the recording medium, and the like are stored into the nonvolatile memory 119. Further, various kinds of programs such as an OS for realizing and executing a multitask configuration of the above programs and the like, adjustment values adapted to make various kinds of control, and the like have been stored into the nonvolatile memory 119. The microcomputer 127 reads out the programs stored in the nonvolatile memory 119 and makes various kinds of control.

Subsequently, each operation member in the camera 100 will be described. A release switch 120 corresponds to image pickup instruction unit. A menu operation switch 121 is provided. Those switches are operation members for inputting various kinds of operation instructions of the microcomputer 127 and are constructed by various kinds of button switches, dials, a touch panel, and the like. Those operation members will be specifically described.

The release switch 120 includes a switch 120a which is turned on by a half depression (SW1 (first operation)) of the release switch 120. When the switch 120a is turned on, a start of the image pickup preparation operation for arithmetically operating (deciding) an in-focus position and an exposure value by the AF (auto-focus) processing and the AE (auto-exposure) processing is instructed. Further, the release switch 120 includes a switch 120b which is turned on by a full depression (SW2 (second operation)) of the release switch 120. When the switch 120b is turned on, a series of processings regarding the image pickup under setting for image pickup which have arithmetically been operated by the image pickup preparation operation is instructed. That is, first, an image pickup processing for transmitting a signal read out of the image pickup element 105 through the A/D converter 106 and the memory control circuit 111 and writing the resultant image data into the memory 113 is instructed. Subsequently, an instruction is made so as to execute a white balance correction processing according to a white balance mode set for the image data, and a development processing by using the image processing circuit 107, read out the developed image data from the memory 113, and compress it by the compression/expansion circuit 114. A recording processing for writing the image data into the recording medium is instructed.

The menu operation switch 121 is constructed by a combination of a menu key, a set key, and a four-way operation key. By using the menu operation switch 121, the user can execute various kinds of operations such as change in various kinds of settings such as photographing conditions, developing conditions, and the like of the camera 100, selection of a power saving mode of an external recording medium, and the like while looking at a screen displayed on the display unit 110.

Subsequently, each component element and accessory units which are connected to the camera 100 will be described. A power source control circuit 122 is constructed by a battery detection circuit, a DC/DC converter, a switch circuit for switching blocks which are energized, and the like. The power source control circuit 122 discriminates whether or not a battery has been attached and detects a battery type and a battery capacity remaining amount. The power source control circuit 122 controls the DC/DC converter based on detection results and an instruction of the microcomputer 127 and supplies necessary voltages to various units including the recording medium for necessary periods of time.

A control unit (I/F) 123 controls the recording medium such as a memory card. A recording medium 125 such as a memory card is connected by a connector 124. A memory card, a hard disk, or the like may be used as a recording medium 125. A memory card constructed by a semiconductor memory is used here. The recording medium 125 has: a recording medium unit 126 constructed by a semiconductor memory; a control unit (I/F) 129 which is an interface with the camera 100 and controls the recording medium unit 126; and a connector 130 for connecting to the camera. An inserting port adapted to insert the recording medium 125 as a memory card is formed in a body frame of the camera 100, thereby enabling the whole card to be enclosed in the body frame. A closable lid for covering the inserting port is provided.

A wireless communication unit 128 enables communication between the camera 100 and another camera or a camera accessory (camera attachment). Although the camera 100 can communicate with a light emitting unit (hereinbelow, referred to as a flash device) serving as a camera accessory in the embodiment, the camera accessory with which the camera can communicate is not limited to such a light emitting unit. As a wireless system, a wireless communication standard such as IEEE 802.15.4, IEEE 802.11a/b/g (wireless LAN), or BlueTooth is used.

Figure 2:
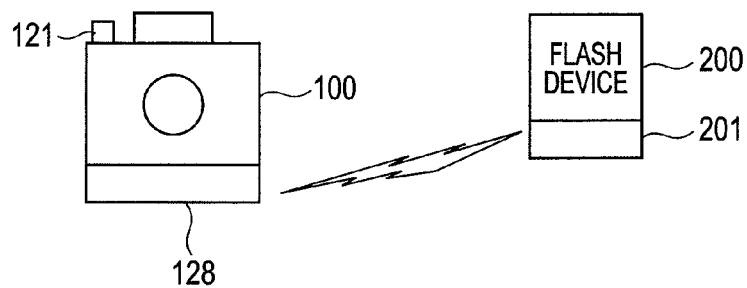
FIG. 2 is a schematic diagram of a camera system in the first embodiment.

The camera 100 according to the embodiment is constructed as mentioned above. FIG. 2 illustrates a schematic diagram of a camera system in the embodiment including the camera 100. In the camera system of the embodiment, the camera 100 and a flash device 200 which is one of the camera accessories wireless-communicate with each other. The flash device 200 has a wireless communication unit 201 for communicating with the wireless communication unit 128 held in the camera 100. The wireless communication is executed by performing data transmission and reception between the wireless communication unit 128 in the camera 100 and the wireless communication unit 201 of the flash device 200.

As data which the flash device 200 receives from the camera 100, for example, there are a setting of a bounce angle, a zoom operation command, a light emitting command, and the like. When the flash device 200 receives such commands, it controls a light emitting unit, a driving unit to adjust a zoom and an angle, and the like included in the flash device 200 according to the commands. A control unit of the flash device 200 to make such control is constructed by, for example, a microcomputer or the like included in the flash device 200.

The wireless communication unit 201 serving as a communication module of the flash device 200 is controlled so as to periodically transit to the sleep state and can suppress stand-by electricity consumption of a power source of the flash device 200 to a value smaller than that in the communication always-active state. It is assumed hereinbelow that such a period at which the wireless communication unit 201 transits to the sleep state is called a "sleep period". Since the wireless communication unit 201 of the flash device 200 periodically transits to the sleep state as mentioned above, the camera 100 makes wireless communication synchronously with the communication active state at an interval between the sleep states of the flash device 200. By receiving a period change command which is transmitted from the camera 100 according to the operation of the release switch 120, the flash device 200 can change the sleep period.

Figure 3:
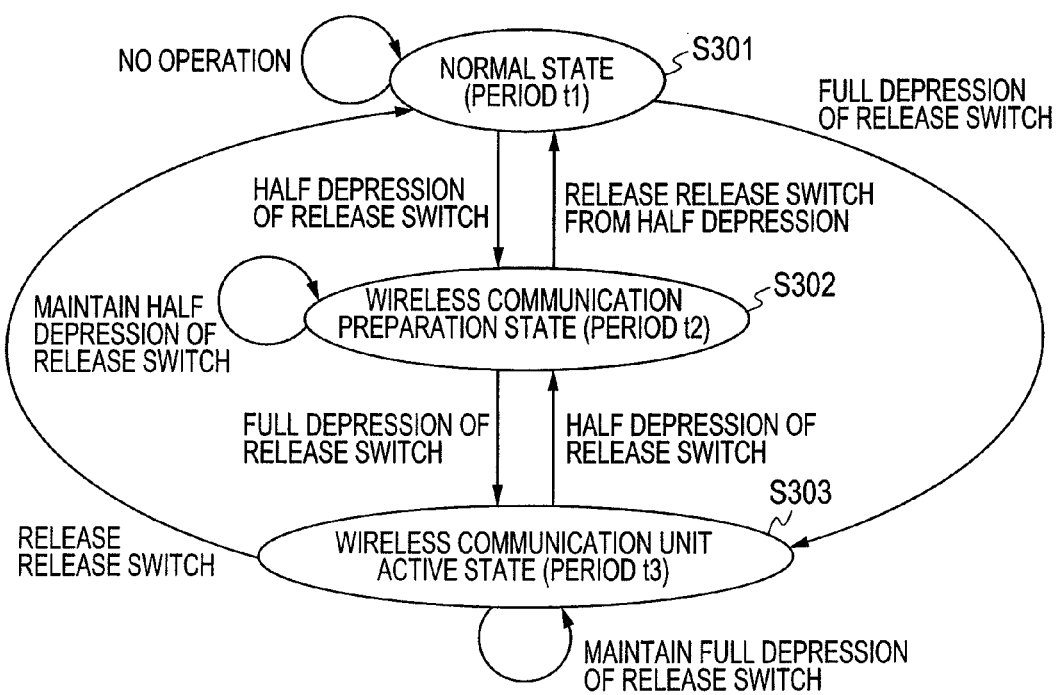
FIG. 3 is a state transition diagram of a flash device according to the operation of the camera in the first embodiment.

Subsequently, FIG. 3 illustrates a state transition diagram of the flash device 200 according to the operation of the camera 100. As illustrated in FIG. 3, the flash device 200 transits to three states of a normal state (S301), a wireless communication preparation state (S302), and a wireless communication unit active state (S303) and switches sleep periods t1, t2, and t3 at which the wireless communication unit 201 is periodically set into the power saving state for every state. A relationship of values among the sleep periods t1, t2, and t3 is set to $t1 > t2 > t3 \geq 0$. All of those states are set on the assumption that the camera 100 and the flash device 200 have already been activated and a wireless communication path has been established by the wireless communication units 128 and 201 held in the camera 100 and the flash device 200, respectively. The sleep periods t1, t2, and t3 are the periods corresponding to a first period, a second period, and a third period, respectively.

In FIG. 3, S301 indicates a state where a wireless communication other than the synchronization is not performed (normal state) and the sleep period in the state of S301 is t1. S302 indicates a state where the flash device transits when the SW1 (120a) has been depressed by the half depression of the release switch 120 (wireless communication preparation state) and the sleep period in the state of S302 is t2. S303 indicates a state where the flash device transits when the SW2 (120b) has been depressed by the full depression of the release switch 120 (wireless communication unit active state) and the sleep period in the state of S303 is t3.

A control method of transiting to each of the foregoing states (S301 to S303) will now be described. The transition to each state is realized when a change command of the sleep period is transmitted from the microcomputer 127 to the flash device 200 through the wireless communication unit 128 and the flash device 200 receives the change command by the wireless communication unit 201.

When the SW1 (120a) of the release switch 120 is depressed in the half depression thereof in the normal state (S301), the flash device 200 receives the change command of the sleep period from the camera 100 and transits to the wireless communication preparation state (S302).

When the SW1 (120a) of the release switch 120 is released from the half depression thereof in the wireless communication preparation state (S302), the flash device 200 receives the change command of the sleep period from the camera 100 and transits to the normal state (S301). When the full depression SW2 (120b) of the release switch 120 is depressed, the flash device 200 receives the change command of the sleep period from the camera 100 and transits to the wireless communication unit active state (S303).

When the SW2 (120b) of the release switch 120 is released from the full depression thereof in the wireless communication unit active state (S303), the flash device 200 receives the change command of the sleep period from the camera 100 and transits to the wireless communication preparation state (S302). When the SW1 (120a) is further released from the half depression thereof, the flash device 200 receives the change command of the sleep period from the camera 100 and transits to the normal state (S301). While the full depression of the SW2 (120b) of the release switch 120 is maintained, the wireless communication unit active state (S303) continues and the sleep period t3 is also maintained.

Figure 4:
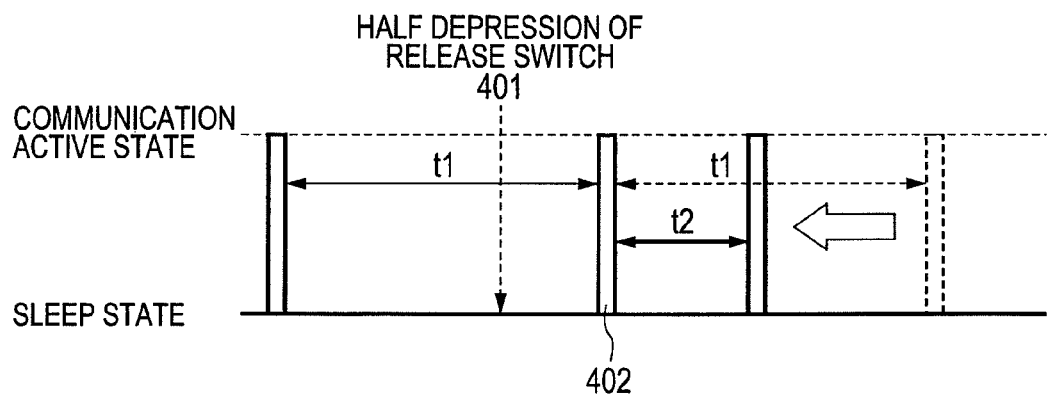
FIG. 4 is a timing chart at the time when the flash device transits from a normal state to a wireless communication preparation state in the first embodiment.

FIG. 4 is a timing chart illustrating details at the time when the flash device 200 transits from the normal state (S301) to the wireless communication preparation state (S302). A control method of the sleep period is similar to the control method at the time of transiting to each state as described in FIG. 3.

In FIG. 4, reference numeral 401 denotes timing when the half depression SW1 (120a) of the release switch 120 is operated in the normal state (S301) corresponding to the sleep period t1.

When the half depression SW1 (120a) is operated at timing 401, the flash device 200 receives the change command of the sleep period at timing 402 when it can communicate with the camera 100 first, transits to the wireless communication preparation state (S302), and changes the sleep period to t2. At this time, the camera 100 gets synchronization of the wireless communication at synchronization timing according to the sleep period t2. A value of t2 here is set to a time obtained by subtracting a time required for communication of the change command of the sleep period from a time required until the shutter 103 is fully released from the full depression SW2 (120b) of the release switch 120. By setting the value of t2 to such a time, even if the full depression SW2 of the release switch 120 is depressed at arbitrary timing, the flash device 200 can receive the light emitting command from the camera 100 before the shutter 103 is fully released. At timing 402, the microcomputer 127 communicates with the flash device 200 in order to transmit a command for executing the operation such as bounce angle setting, zoom, or the like of the flash device 200 by the wireless communication unit 128. The flash device 200 receives such a setting command by the wireless communication unit 201.

When the full depression SW2 (120b) of the release switch 120 is operated at timing 401 in the normal state (S301), the flash device 200 does not transit to the wireless communication preparation state (S302) but transits to the wireless communication unit active state (S303) at the timing 402. That is, when the half depression SW1 (120a) and the full depression SW2 (120b) are operated within the sleep period t1, the flash device 200 skips the wireless communication preparation state (S302) and transits to the wireless communication unit active state (S303). The sleep period is changed to t3 and the synchronization is obtained. The setting of t3 will be described in detail with reference to FIG. 5.

Figure 5:
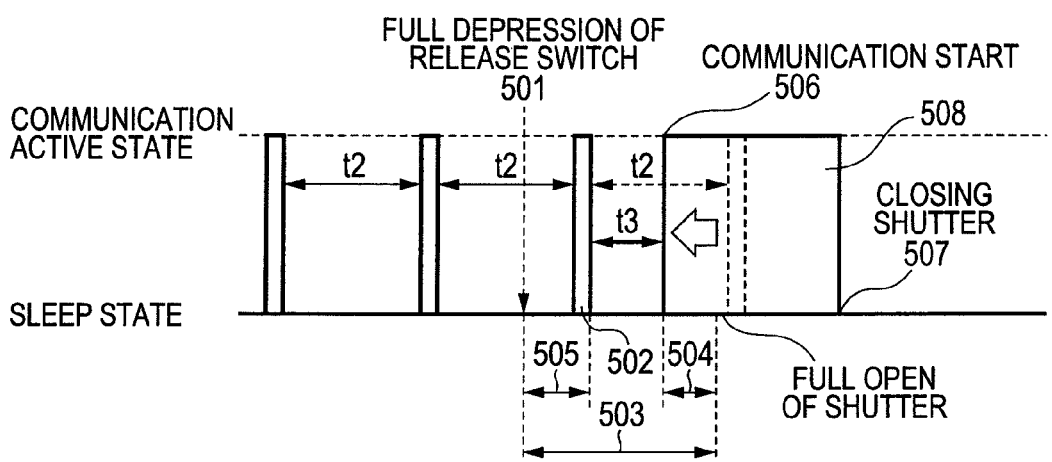
FIG. 5 is a timing chart at the time when the flash device transits from the wireless communication preparation state to a wireless communication unit active state in the first embodiment.

FIG. 5 is a timing chart illustrating details at the time when the flash device 200 transits from the wireless communication preparation state (S302) to the wireless communication unit active state (S303).

In FIG. 5, reference numeral 501 denotes timing when the full depression SW2 (120b) of the release switch 120 is operated into the wireless communication preparation state (S302) corresponding to the sleep period t2.

When the full depression SW2 (120b) is operated at timing 501, the flash device 200 receives the change command of the sleep period at timing 502 when it can communicate with the camera 100 first and transits to the wireless communication unit active state (S303). The sleep period is changed to t3. At this time, the camera 100 gets synchronization of the wireless communication at synchronization timing according to the sleep period t3. Now, assuming that a time until the shutter 103 is fully released from the timing 501 is set to 503, a time required for communication of the light emitting command is set to 504, and a time between timing 501 and timing 502 is set to 505, a value of t3 is set to a time obtained by subtracting the time 504 and time 505 from the time 503. By setting t3 to such a time, the flash device can emit the light at communication start timing shown at 506 in response to the light emitting command simultaneously with that the shutter 103 has fully been released.

The microcomputer 127 communicates with the flash device 200 in order to transmit the light emitting command by the wireless communication unit 128 at the timing 506 when it can communicate with the camera 100 first after the sleep period was changed to t3. The flash device 200 receives the light emitting command by the wireless communication unit 201 and subsequently emits the light. The value of the sleep period t3 at this time may be set to 0, that is, the flash device may be set to the communication always-active state (508). In this case, the valid period of the communication always-active state is set to a period until timing 507 at which the shutter 103 is closed.

In the case of transiting from the wireless communication preparation state (S302) to the normal state (S301), the following operation is executed. First, the SW1 (120a) of the release switch 120 is released from the half depression thereof at the timing 501 when the full depression SW2 (120b) of the release switch 120 is operated. After the SW1 was released, the sleep period is changed to t1 and the synchronization is obtained in the normal state (S301) after the timing 502 when the flash device is synchronized with the camera 100 first.

Subsequently, a case of transiting from the wireless communication unit active state (S303) to the wireless communication preparation state (S302) or the normal state (S301) will be described in detail. If the half depression SW1 (120a) of the release switch 120 has already been depressed at the timing 507 when the shutter 103 is closed, the sleep period is changed to t2 and the synchronization if the wireless communication is obtained in the wireless communication preparation state (S302) after the timing 507. If the release switch is not depressed at the timing 507, the sleep period is changed to t1 and the synchronization of the wireless communication is obtained in the normal state (S301) after the timing 507.

As described above, in the first embodiment of the invention, control is made so as to shorten the sleep period of the wireless communication unit 201 of the flash device 200 according to the operation of the SW1 (120a) and SW2 (120b) of the release switch 120. Thus, by shortening the wireless communication timing at the pre-stage before the flash device 200 is allowed to emit the light by the light emitting command of the camera 100, the flash device 200 is allowed to receive the light emitting command without a delay, thereby preventing a delay from occurring in the light emitting timing of the flash device 200 and in the photographing timing. At this time, since the sleep period also exists after the control of the sleep period, the stand-by electricity consumption can be suppressed to a value smaller than that in the communication always-active state as much as possible.

Second Embodiment

Figure 6:
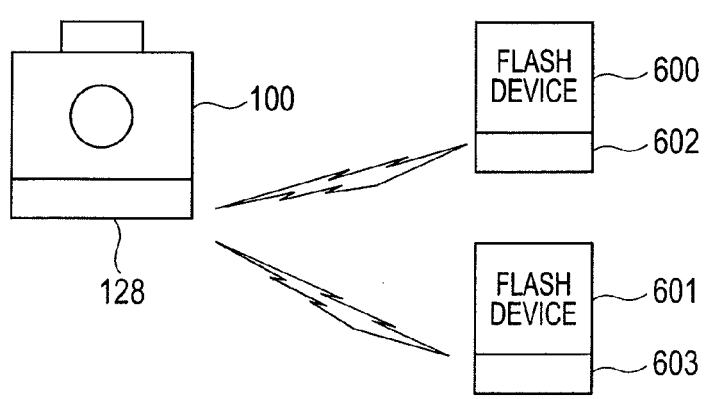
FIG. 6 is a diagram illustrating a construction of a camera system in the second embodiment.

Subsequently, the second embodiment of the invention will be described. FIG. 6 is a diagram illustrating a construction of a camera system in the second embodiment. In FIG. 6, the camera system is constructed by the camera 100 and two flash devices 600 and 601. A construction of the camera 100 is similar to the construction described in the first embodiment. A construction of each of the flash devices 600 and 601 is also similar to the construction described in the first embodiment. The flash devices 600 and 601 have wireless communication units 602 and 603 in order to communicate with the wireless communication unit 128 held in the camera 100, respectively. Each of the wireless communication units 602 and 603 is similar to that of the flash device 200 described in the first embodiment.

In the case where there are a plurality of flash devices as in the embodiment, there may exist a flash device as a non-control object which does not need to be operated in accordance with circumstances. In the embodiment, a construction of making the flash devices 600 and 601 control objects so that they can be selected and making the flash device a non-control object so that it can be selected will be described. Since the operation of the flash device as a control object is similar to that of the flash device 200 described in the first embodiment, its description is omitted here.

Figure 7:
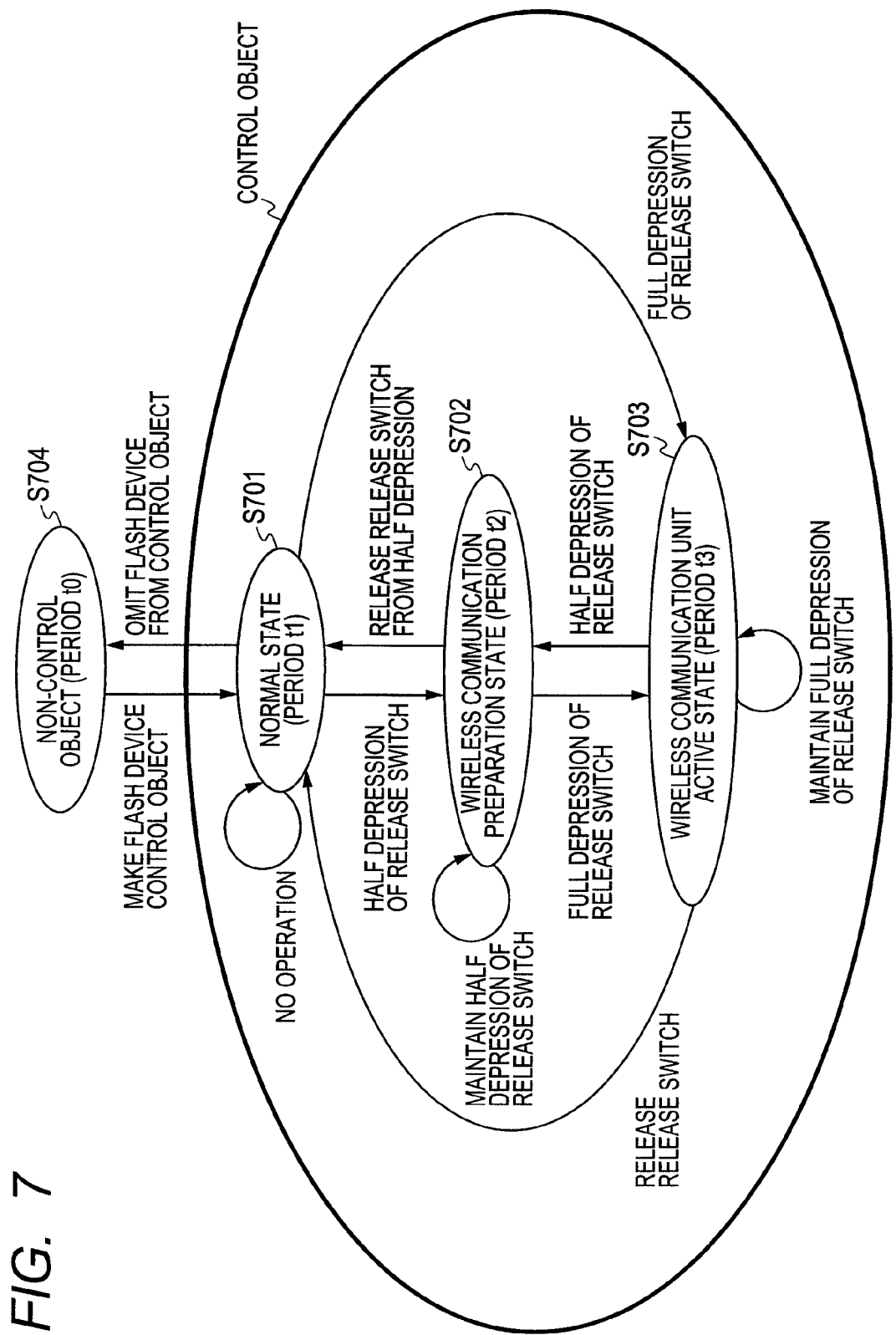
FIG. 7 is a state transition diagram of a flash device according to the operation of the camera in the second embodiment.

FIG. 7 is a state transition diagram of each of the flash devices 600 and 601 according to the operation of the camera 100 in the embodiment.

As illustrated in FIG. 7, in the embodiment, each of the flash devices 600 and 601 transits to four states of a normal state (S701), a wireless communication preparation state (S702), a wireless communication unit active state (S703), and a non-control object (S704). Each of the normal state (S701), wireless communication preparation state (S702), and wireless communication unit active state (S703) is a state to which the flash device transits when it becomes a control object, and those states are similar to the foregoing normal state (S301), wireless communication preparation state (S302), and wireless communication unit active state (S303). The transition from the non-control object (S704) to the control object has substantially the same meaning as that of the transition to the normal state (S701). For a time interval when the flash device has transited to the control object, it operates in a manner similar to the operation described in the first embodiment.

Describing in detail, in FIG. 7, S704 denotes the state (non-control object) where the flash device is not selected as a control object by the menu operation switch 121 of the camera 100 and the sleep period is equal to t0 (initial period). S701 denotes the state (normal state) where the flash device has been selected as a control object by the menu operation switch 121 of the camera 100 and has substantially the same meaning as that of S301. S702 denotes the state (wireless communication preparation state) where the flash device has been selected as a control object by the menu operation switch 121 of the camera 100 and has substantially the same meaning as that of S302. S703 denotes the state (wireless communication unit active state) selected as a control object by the menu operation switch 121 of the camera 100 and has substantially the same meaning as that of S303.

The sleep period of the non-control object (S704) is set to t0. The sleep period t1 of the normal state (S701) and the sleep period t2 of the wireless communication preparation state (S702) are longer than the sleep period t3 of the wireless communication unit active state (S703). The relationship of values among the sleep periods t0, t1, t2, and t3 is set to t0>t1>t2>t3≧0. All of those states are set on the assumption that the camera 100 and the flash devices 600 and 601 have already been activated and wireless communication paths have been established by the wireless communication units 128, 602, and 603 held in the camera 100 and the flash devices 600 and 601, respectively.

Subsequently, a control method of transiting to each of the foregoing states will be described. The transition to each state is realized when the change command of the sleep period is transmitted from the microcomputer 127 to the flash devices 600 and 601 through the wireless communication unit 128 and the flash devices 600 and 601 receive the change command by the wireless communication units 602 and 603. When the flash device transits from the non-control object (S704) to the normal state (S701), the wireless communication unit 128 also transmits a notification (or information) of the control objects. It is assumed that for a time interval during which the flash device 600 has transited from the non-control object (S704) to the normal state (S701), the wireless communication unit 128 does not transmit the commands which are based on the operation of the half depression SW1 (120a) and the full depression SW2 (120b) of the release switch 120.

The flash device 600 or 601 receives the notification of the control object from the camera 100 and transits to the normal state (S701) if it is selected as a control object by the menu operation switch 121 in the non-control object (S704). The flash device 600 or 601 transits to non-control object (S704) if it is not selected as a control object or cancelled from the control object by the menu operation switch 121 in the normal state (S701). Since a transiting method in the control object is similar to that in the first embodiment, its description is omitted.

Figure 8:
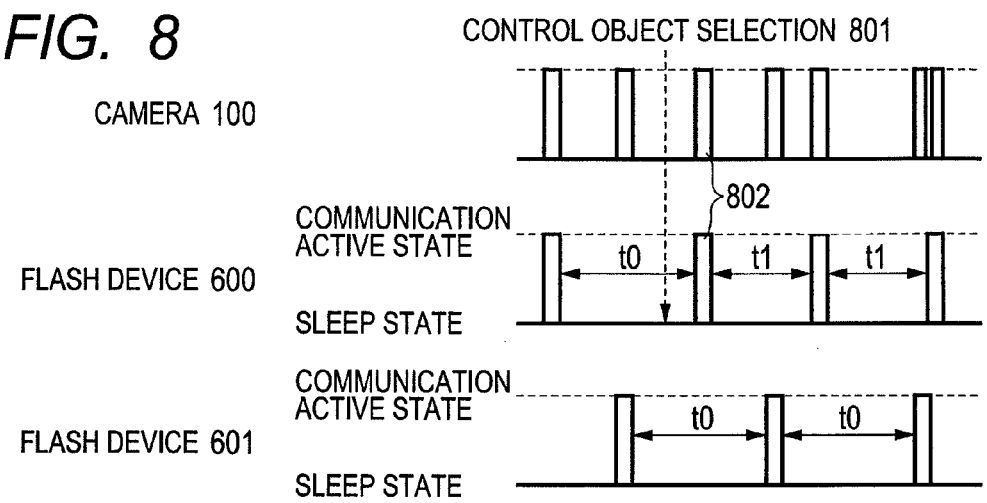
FIG. 8 is a timing chart at the time when the flash device as a non-control object transits to the normal state in the second embodiment.

FIG. 8 is a timing chart illustrating details at the time when only the flash device 600 between the flash devices 600 and 601 of the non-control objects (S704) transits to the normal state (S701). In the following description, it is assumed that a case where the flash device 600 is selected as a control object by the menu operation switch 121 when the flash devices 600 and 601 are the non-control objects will be specifically described as an example.

In FIG. 8, reference numeral 801 denotes timing when the flash device 600 as a non-control object (S704) is selected as a control object by the menu operation switch 121.

When the flash device 600 is selected as a control object by the menu operation switch 121 at the timing 801, it is selected as a control object at timing 802 when it can communicate with the camera 100 first. The flash device 600 changes the sleep period from t0 to t1 and the synchronization with the communication period of the camera 100 is obtained. After that, the flash device 600 operates in a manner similar to the first embodiment until it is selected as a non-control object (S704) by the menu operation switch 121.

The flash device 601 changes the sleep period to t0 as a non-control object (S704) and the synchronization of the wireless communication is obtained until it is selected as a control object by the menu operation switch 121. At this time, the flash device 601 does not receive any command other than the command of the control object notification which is based on the menu operation switch 121.

As described above, in the second embodiment of the invention, either one or both of the flash devices 600 and 601 other than the two non-control objects (S704) can be selected by using the menu operation switch 121. The selected flash device 600 transits to the normal state (S701) and the effects mentioned in the first embodiment can be expected. Further, the flash device 601 of the non-control object (S704) can suppress the stand-by electricity consumption to a value smaller than that in the normal state (S701).

Third Embodiment

Subsequently, the third embodiment of the invention will be described. A construction of a camera system in the embodiment is similar to that in FIG. 6 illustrated in the second embodiment. In the third embodiment, a case where the flash devices 600 and 601 are selected as control objects by the menu operation switch 121 when the flash devices 600 and 601 are the non-control objects (S704) will now be described. At this time, as for the flash devices 600 and 601, if the synchronization timing when the wireless communication path between the flash device 600 and the camera 100 has been established and that between the flash device 601 and the camera 100 differ, the timing for synchronizing with the camera 100 also differ. Therefore, in the case of selecting both of the flash devices 600 and 601 as control objects, it is necessary to match the synchronization timing when the control objects are selected. In the embodiment, the operation for changing the sleep periods of the flash devices 600 and 601 by matching the synchronization timing of the wireless communication of the flash devices 600 and 601 will be described.

Figure 9:
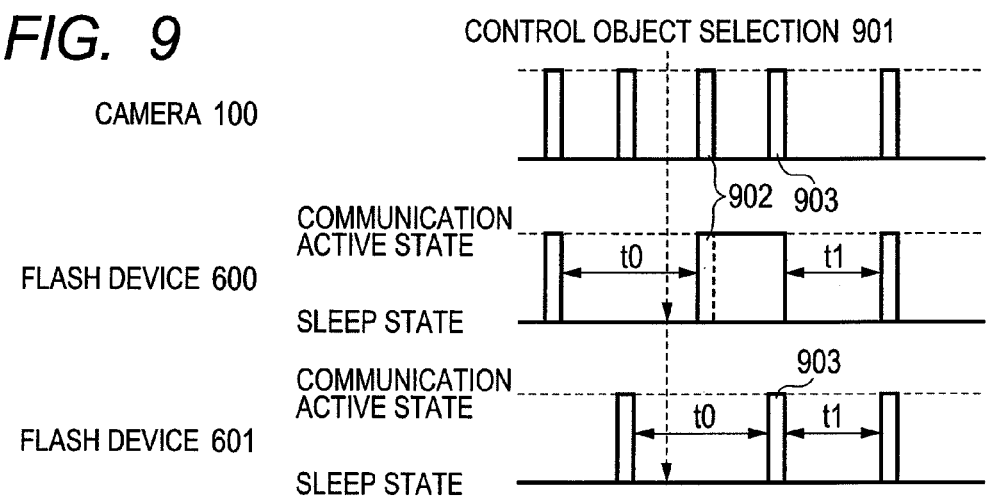
FIG. 9 is a timing chart at the time when flash devices as non-control objects transit to the normal state of control objects in the third embodiment.

FIG. 9 is a timing chart illustrating details at the time when the flash devices 600 and 601 as non-control objects (S704) transit to the normal state (S701) in the control objects in the embodiment. As illustrated in FIG. 9, the synchronization timing of the wireless communication in the state of the non-control objects of the flash devices 600 and 601 differ.

In FIG. 9, reference numeral 901 denotes timing when the flash devices 600 and 601 as non-control objects (S704) are selected as control objects by the menu operation switch 121.

When the flash devices 600 and 601 are selected as control objects by the menu operation switch 121 at the timing 901, the flash device 600 is selected as a control object at timing 902 when it can communicate with the camera 100 first. The flash device 601 is similarly selected as a control object at timing 903.

At the timing 902 and 903, the microcomputer 127 transmits the notification of the control objects and the command for changing the sleep period from t0 to t1, to the flash devices 600 and 601 by the wireless communication unit 128 and the flash devices 600 and 601 receive them by the wireless communication units 602 and 603. At this time, since the timing 902 is earlier than the timing 903, in the embodiment, the microcomputer 127 transmits the command for setting the communicating state of the flash device 600 to the communication active state until the timing 903 to the flash device 600. The flash device 600 receives the command by the wireless communication unit 602. After the flash device 601 was selected as a control object at the timing 903, the flash devices 600 and 601 are set into the normal state (S701) and the sleep period is changed to t1, thereby obtaining the synchronization.

If the timing 903 is earlier than the timing 902, the microcomputer 127 transmits the command for enabling the flash device 601 to communicate until the timing 902 to the flash device 601 by the wireless communication unit 128 at the timing 903. The flash device 601 receives the command by the wireless communication unit 603. After the flash device 601 was selected as a control object at the timing 902, the flash devices 600 and 601 are set into the normal state (S701) and the sleep period is changed to t1, thereby obtaining the synchronization.

It is assumed that for a time interval during which the flash devices 600 and 601 have transited from the non-control objects (S704) to the normal state (S701), the transmission and reception of the commands which are based on the operation of the half depression SW1 (120a) and the full depression SW2 (120b) of the release switch 120, are not executed.

As mentioned above, in the third embodiment of the invention, when a plurality of flash devices 600 and 601 are selected as control objects, even if they have been synchronized with the camera 100 at different timing, the flash devices 600 and 601 can be synchronized with the camera 100 at the same timing. The effects mentioned in the first embodiment can be expected for both of the flash devices 600 and 601. Although the embodiment has been mentioned with respect to the case where there are two flash devices which are selected as control objects, even if three or more flash devices are selected as control objects, the synchronization timing of all flash devices can be matched by processings similar to those mentioned above. That is, for a time interval until the timing when a certain flash device is synchronized with the camera 100 latest from the timing 901, if another flash device is held in the communication active state even after it was synchronized with the camera 100, the foregoing effect is accomplished.

Fourth Embodiment

Subsequently, the fourth embodiment of the invention will be described. A construction of a camera system in the embodiment is similar to that in FIG. 6 illustrated in the second embodiment. A case where when the flash device 600 has already been set in the normal state (S701) and the flash device 601 is the non-control object (S704), the camera 100 newly selects the flash device 601 as a control object will be described.

Figure 10:
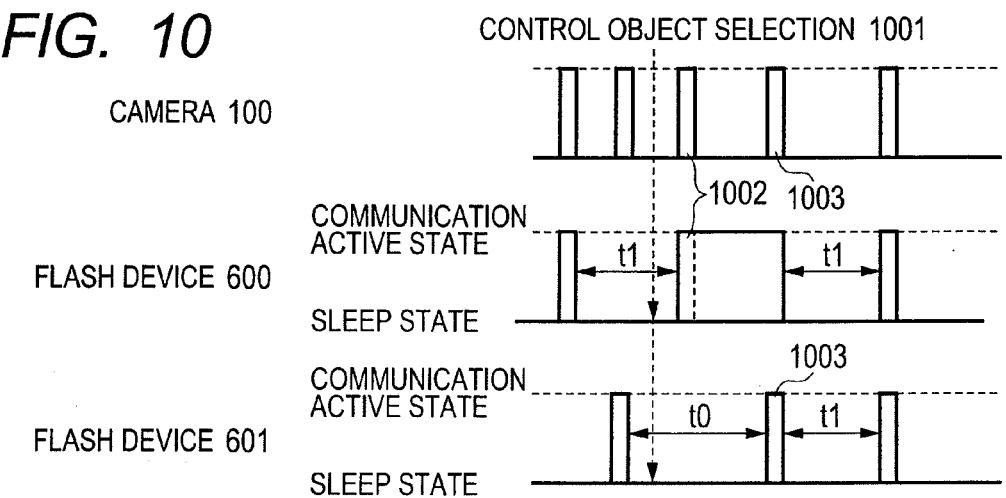
FIG. 10 is a timing chart at the time when one flash device has already been in the normal state and another flash device transits from a non-control object to the normal state in the fourth embodiment.

FIG. 10 is a timing chart illustrating details at the time when the flash device 600 has already been in the normal state (S701) and the flash device 601 transits from the non-control object (S704) to the normal state (S701) in the embodiment.

In FIG. 10, reference numeral 1001 denotes timing when the flash device 601 as a non-control object (S704) is newly selected as a control object by the menu operation switch 121. Reference numeral 1002 denotes timing when the flash device 600 as a control object (S702) can communicate with the camera 100 first from the timing 1001. Reference numeral 1003 denotes timing when the flash device 601 newly selected as a control object can communicate with the camera 100 first.

When the flash device 601 is selected as a control object by the menu operation switch 121 at the timing 1001, the flash device 601 is selected as a control object at the timing 1003 when it can communicate with the camera 100 first. At the timing 1003, the microcomputer 127 transmits the notification of the control object and the command for changing the sleep period from t0 to t1, to the flash device 601 by the wireless communication unit 128 and the flash device 601 receives them by the wireless communication unit 603.

At this time, since the timing 1002 is earlier than the timing 1003 as illustrated in FIG. 10, at the timing 1002, the camera 100 transmits the command for enabling the flash device 600 to communicate until the timing 1003, to the flash device 600 from the wireless communication unit 128. The flash device 600 receives the command by the wireless communication unit 602. The flash device 601 is selected as a control object at the timing 1003. After the flash device 601 transits to the normal state (S701), the flash devices 600 and 601 change the sleep period to t1, thereby obtaining the synchronization.

When the timing 1003 is earlier than the timing 1002, at the timing 1003, the microcomputer 127 transmits the command for enabling the flash device 601 to communicate until the timing 1002, to the flash device 601 by the wireless communication unit 128. The flash device 601 receives the command by the wireless communication unit 603. The flash device 601 also transits to the normal state (S701) in the control object from the timing 1003 and the flash devices 600 and 601 are synchronized at the sleep period t1 from the timing 1002.

It is assumed that for a time interval during which the flash device 601 has transited from the non-control object (S704) to the normal state (S701), the camera 100 does not transmit the commands which are based on the operation of the half depression SW1 (120a) and the full depression SW2 (120b) of the release switch 120.

As mentioned above, in the fourth embodiment of the invention, when the flash device 601 as a non-control object (S704) is newly selected as a control object in addition to the flash device 600 which has already been in the normal state (S701), the timing for the wireless communication with the camera 100 for each flash device is matched. That is, even if a plurality of flash devices are synchronized with the camera 100 at the different timing, the flash devices 600 and 601 can be synchronized with the camera 100 at the same timing. The effects mentioned in the first embodiment can be expected for both of the flash devices 600 and 601.

A storage medium in which program codes (computer program) of software for realizing the functions of the embodiments mentioned above have been recorded may be used to realize the invention. In this case, the objects of the invention are realized by a method whereby the storage medium is supplied to a system or apparatus and a computer (or a CPU or MPU) of the system or apparatus reads out the program codes stored in the storage medium and executes them. In this case, the program codes themselves read out of the storage medium realize the functions of the embodiments mentioned above. The program codes themselves and the storage medium in which the program codes have been stored construct the invention. As a storage medium for supplying the program codes, for example, a flexible disk, a hard disk, an optical disk, a magnetooptic disk, a CD-ROM, a CD-R, a magnetic tape, a nonvolatile memory card, a ROM, or the like can be used. Naturally, the invention also incorporates a case where an OS (fundamental system or operating system) or the like which is operating on the computer executes a part or all of actual processes based on instructions of the program codes. Further, the program codes read out of the storage medium may be written into a memory provided for a function expanding board inserted in the computer or a function expanding unit connected to the computer. In this case, a CPU or the like provided for the function expanding board or function expanding unit may execute a part or all of the actual processes based on the instructions of the written program codes.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2009-212111 filed Sep. 14, 2009 which is hereby incorporated by reference herein in its entirety.

What is claimed is:

1. An image pickup apparatus comprising:
a wireless communication unit configured to wirelessly communicate with an external apparatus which is arranged to be periodically set into a power saving state; and
an operation unit, configured to accept a first operation for instructing an image pickup preparation to decide a setting for image pickup and a second operation for instructing an image pickup based on the image pickup preparation operation,
wherein the wireless communication unit transmits, to the external apparatus, a change signal for changing the setting of the power saving state of the external apparatus, in accordance with the first or second operation being accepted by the operation unit, and
wherein, when the operation unit accepts the first operation, the wireless communication unit transmits a change signal for changing a power saving period of time during which the external apparatus is in the power saving state from a first period to a second period, where the second period is shorter than the first period.

2. The apparatus according to claim 1, wherein the wireless communication unit transmits a change signal for shortening a period of time during which the external apparatus is in the power saving state, in accordance with the first or second operation being accepted by the operation unit.

3. The apparatus according to claim 1, wherein the wireless communication unit transmits a change signal for setting a power saving period of time during which the external apparatus is in the power saving state to zero, in accordance with the first or second operation being accepted by the operation unit.

4. The apparatus according to claim 1, wherein the wireless communication unit transmits a change signal for returning the power saving period of time back to the first period, when the operation unit is released from the acceptance of the first operation.

5. The apparatus according to claim 1, wherein the wireless communication unit transmits a change signal for changing the power saving period of time to a third period in accordance with the second operation being accepted, where the third period is shorter than the second period.

6. The apparatus according to claim 5, wherein the wireless communication unit transmits a change signal for returning the power saving period of time back to the second period, when the operation unit is released from the acceptance of the second operation.

7. The apparatus according to claim 5, wherein the wireless communication unit transmits a change signal for changing the power saving period of time from the first period to the third period, in accordance with the second operation being accepted while the power saving period of time is the first period.

8. The apparatus according to claim 5, wherein the power saving period of time is the third period, for a time period during which the second operation is continued by the operation unit.

9. The apparatus according to claim 1, further comprising:
a selection unit, configured to select an external apparatus to be served as a control object from a plurality of external apparatuses,
wherein the power saving period of time of the external apparatus which is not the control object is a fourth period longer than the first period, and
the wireless communication unit transmits a change signal for changing from the fourth period to the first period, to the external apparatus selected by the selection unit.

10. The apparatus according to claim 1, further comprising:
a selection unit, configured to select an external apparatus to be served as a control object from a plurality of external apparatuses,
wherein the wireless communication unit performs synchronization communication for a period of time during which the external apparatus is not in the power saving state, and
in a case where a plurality of external apparatuses are selected by the selection unit and timing of the synchronization communication of the external apparatuses are different, the wireless communication unit transmits a signal for preventing the selected external apparatus from transiting to the power saving state, for a time interval during which the wireless communication unit synchronously communicates with all of the selected external apparatuses.

11. An external apparatus of an image pickup apparatus having an operation unit, configured to accept a first operation for instructing an image pickup preparation to decide a setting for image pickup and a second operation for instructing an image pickup which is based on the image pickup preparation operation, the external apparatus comprising:
a wireless communication unit, configured to wirelessly communicate with the image pickup apparatus;
a state setting unit, configured to periodically set the external apparatus into a power saving state; and
a state control unit, configured to control the state setting unit to change the setting of the power saving state when a change signal transmitted from the image pickup apparatus is received by the wireless communication unit,
wherein the change signal is a signal for changing the setting of the power saving state and is transmitted from the image pickup apparatus in accordance with the first operation for instructing the image pickup preparation to decide the setting for image pickup or the second operation for instructing the image pickup which is based on the image pickup preparation operation that is accepted by the operation unit of the image pickup apparatus, and
wherein, when the first operation is accepted by the operation unit, a change signal for changing a power saving period of time during which the external apparatus is in the power saving state from a first period to a second period is transmitted from the image pickup apparatus, where the second period is shorter than the first period.

12. A control method of an image pickup apparatus having an operation unit, configured to accept a first operation for instructing an image pickup preparation to decide a setting for image pickup and a second operation for instructing an image pickup which is based on the image pickup preparation operation, the control method comprising:
wirelessly communicating with an external apparatus which is arranged to be periodically set into a power saving state; and
forming a change signal for changing the setting of the power saving state in the external apparatus, in accordance with the first or second operation being accepted by the operation unit,
wherein, in the wirelessly communicating step, the change signal formed in the forming step is transmitted to the external apparatus, and
wherein, when the operation unit accepts the first operation, a change signal for changing a power saving period of time during which the external apparatus is in the power saving state from a first period to a second period is formed in the forming step and transmitted in the wirelessly communicating step, where the second period is shorter than the first period.

13. A non-transitory computer-readable recording medium storing a program comprising a program code for causing a computer to execute a control method according to claim 12.

14. A control method of an external apparatus having a wireless communication unit, configured to wirelessly communicate with an image pickup apparatus having an operation unit, configured to accept a first operation for instructing an image pickup preparation to decide a setting for image pickup and a second operation for instructing an image pickup which is based on the image pickup preparation operation, the control method comprising:
periodically setting the external apparatus into a power saving state; and
changing the setting of the power saving state when the wireless communication unit receives a change signal transmitted from the image pickup apparatus,
wherein the change signal is a signal for changing the setting of the power saving state and is transmitted in accordance with the first operation for instructing the image pickup preparation to decide the setting for image pickup or the second operation for instructing the image pickup which is based on the image pickup preparation operation that is accepted by the operation unit of the image pickup apparatus, and
wherein, when the first operation is accepted by the operation unit, a change signal for changing a power saving period of time during which the external apparatus is in the power saving state from a first period to a second period is transmitted from the image pickup apparatus, where the second period is shorter than the first period.

15. A non-transitory computer-readable recording medium storing a program comprising a program code for causing a computer to execute a control method according to claim 14.

16. The apparatus according to claim 1, wherein the external apparatus includes an accessory apparatus of the image pickup apparatus.

17. The apparatus according to claim 11, wherein the external apparatus is an accessory apparatus of the image pickup apparatus.

* * * * *